No. 781,826. PATENTED FEB. 7, 1905.
H. W. HEMINGWAY.
PROCESS OF MAKING NITRIC ACID.
APPLICATION FILED NOV. 10, 1902.
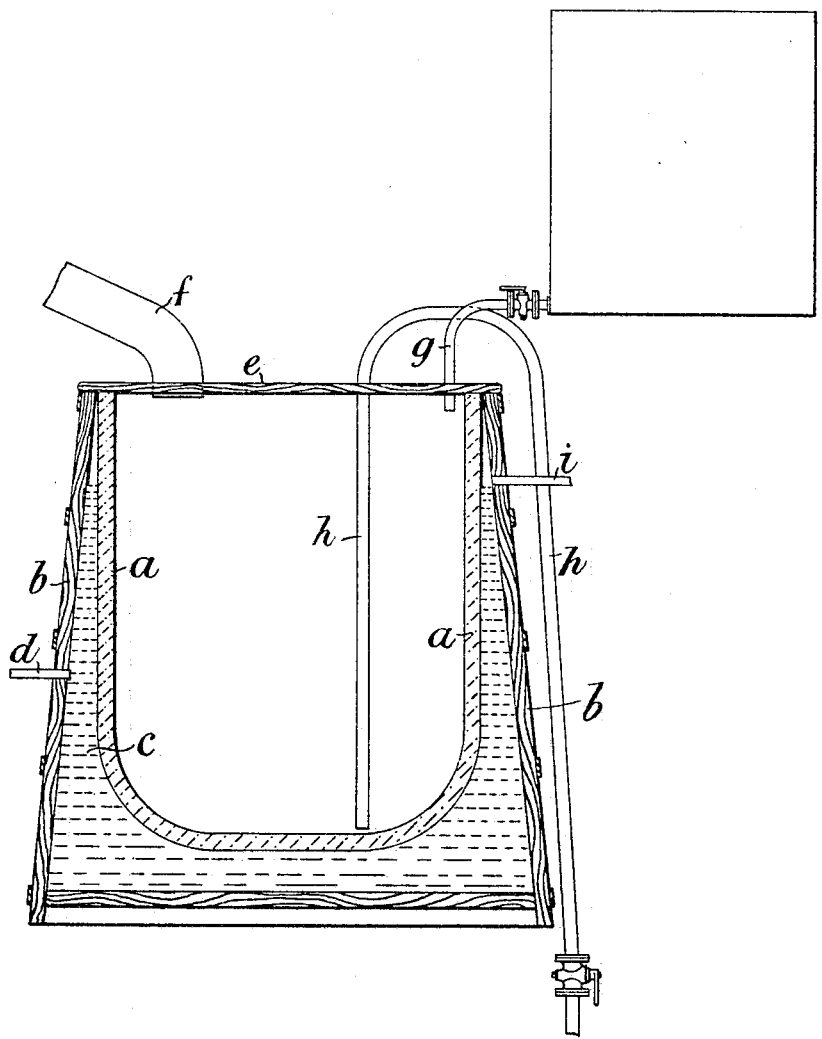
Witnesses:
CJ. Ashdown.
Norman S.B. Jones.
Inventor:
H. W. Hemingway No. 781,826. Patented February 7, 1905.

UNITED STATES PATENT OFFICE.

HENRY WILLIAM HEMINGWAY, OF WALTHAMSTOW, ENGLAND.

PROCESS OF MAKING NITRIC ACID.

SPECIFICATION forming part of Letters Patent No. 781,826, dated February 7, 1905.

Application filed November 10, 1902. Serial No. 130,757.

*To all whom it may concern:*

Be it known that I, HENRY WILLIAM HEMINGWAY, a subject of the King of Great Britain and Ireland, residing at "Albyns," Forest Road, Walthamstow, in the county of Essex, England, have invented new and useful Improvements in the Manufacture of Nitric Acid and Incidentally in the Production of Certain Ferric Salts, of which the following is a specification.

In the manufacture of nitric acid by heating sodium nitrate or potassium nitrate with sulfuric acid considerable inconvenience results from the nitrous fumes being evolved in intermittent and more or less violent rushes.

My present process is designed to insure a practically constant yield and steady flow of the nitrous fumes.

The accompanying drawing illustrates diagrammatically a vertical section of apparatus adapted for employment in the manufacture of nitric acid according to my improved process.

In carrying out my improved process I add to nitrate of soda or to nitrate of potash (either of which substances may be employed for the production of nitric acid and ferric sulfate) sulfuric acid, together with a suitable quantity of water, the quantity of sulfuric acid being slightly in excess of that necessary for combining with the soda (or potash) presently to be set at liberty. The mixture is made in an earthenware retort or covered pan so constructed that the temperature can be raised to 170° Fahrenheit, provision being made for carrying away the vapors yielded and conducting them through a series of Woulfe's bottles, towers, or other form of condensing apparatus. The mixture having been heated to about the before-mentioned temperature, I introduce protosulfate of iron (common green copperas) either continuously or in frequent small charges. The protosulfate of iron becomes oxidized at the expense of the nitrate of soda (or of potash) and nitrous fumes are generated. On these being condensed and air being admitted nitric acid is formed.

In the apparatus illustrated, *a* is the earthenware retort or pan, which is set in a tub or other convenient receptacle *b* and surrounded by water *c*. This water is heated by means of steam which is admitted or blown thereinto by way of the pipe *d*.

*e* is the cover, and *f* is a pipe whereby the fumes or vapors yielded are conducted to the Woulfe's bottles or other condensing apparatus.

*g* is a pipe for supplying a regulated quantity of protosulfate of iron to the mixture.

*h* is a siphon for use in effecting the removal of the by-product, hereinafter referred to.

*i* is the outlet for steam.

Instead of condensing in Woulfe's bottles, towers, or the like I conduct the nitrous fumes into vitriol-chambers for the oxidation of sulfurous acid, a steady flow of the nitrous fumes being obtained in place of the intermittent and violent rushes of fumes which occur when working according to the methods hitherto employed.

In carrying out the process above described I obtain as by-products ferric sulfate and sodium sulfate, (or potassium sulfate when nitrate of potash is employed.) Ferric sulfate is known to be a valuable product as a disinfectant and sewage precipitant.

Where the manufacture of nitric acid according to my improved method is carried out in a locality where waste pickle liquor (made with sulfuric acid) is available, same may be substituted for the dilute sulfuric acid and green copperas in crystalline form. According to a further modification there may be substituted for the sulfuric acid and green copperas hydrochloric acid and ferrous chlorid, or pickle liquor made with hydrochloric acid may be employed. Where hydrochloric acid and ferrous chlorid are employed, ferric chlorid and sodium chlorid are yielded as by-products.

What I claim as my invention, and desire to secure by Letters Patent, is—

1. The herein-described process for the regular generation of nitrous fumes, consisting in first mixing together a suitable nitrate and acid, raising the mixture to the required temperature and then gradually adding a ferrous salt.

2. The herein-described process for the manufacture of nitric acid and the production of ferric sulfate and sodium sulfate as by-products, consisting in first mixing together nitrate of soda, sulfuric acid and water, raising the mixture to about 170° Fahrenheit; then adding protosulfate of iron by degrees, condensing in suitable vessels the nitrous fumes thus generated and admitting air thereto.

In testimony whereof I have signed my name to this specification in the presence of two subscribing witnesses.

HENRY WILLIAM HEMINGWAY.

Witnesses:
 W. H. DORMER,
 GEO. FAULKNER.